Patented Oct. 21, 1947

2,429,244

UNITED STATES PATENT OFFICE 2,429,244

1-d-RIBITYLAMINO-3,4-XYLOL AND PROCESS FOR THE MANUFACTURE OF SAME

Hans Spiegelberg, Basel, Switzerland, assignor to Hoffmann-La Roche Inc., Nutley, N. J., a corporation of New Jersey No Drawing. Application November 3, 1945, Serial No. 626,569. In Switzerland November 24, 1944

7 Claims. (Cl. 260—211)

1-d-ribitylamino-3,4-xylol is an intermediate product for the preparation of lactoflavine (vitamin B₂). According to the methods hitherto known for the preparation of the said intermediate product it is necessary to start from solid, crystalline d-ribose. However, d-ribose is a very difficultly obtainable sugar; all the trouble arising during the manufacture of solid, crystalline ribose, consequent to the high solubility thereof, considerably increases the cost of the manufacture of the said compound and, consequently, of the manufacture of synthetic lactoflavine.

It has now been found that 1-d-ribitylamino-3,4-xylol can be obtained more easily by reacting d-ribose in the presence of at least 1 mol of boric acid with 1 mol of 3,4-dimethylaniline and catalytically hydrogenating the compound obtained.

The intermediate product formed in the first reaction step is a boric acid compound of the condensation product of d-ribose with 3,4-dimethylaniline; it is a colorless, crystalline substance which, on heating, turns brown at 150° C. and decomposes completely at 183° C. According to the analysis, the compound is considered to correspond to the elementary formula $C_{13}H_{18}O_5NB$.

For carrying out the process it is advantageous to use a solution of d-ribose in water or another solvent miscible with water, as, for instance, alcohol, acetone, or mixtures thereof. This solution may be crude; there is no need to purify the same by eliminating other sugars which may be present from the preparation of the ribose. Preferably, the mixture is set acid so as to have a uH of about 4. The catalytic hydrogenation will preferably be carried out in the presence of an alcoholic solvent, such as, for instance, methyl or ethyl alcohol, and at a temperature substantially not exceeding 60° C. As catalysts Raney nickel or palladium charcoal may be used. After hydrogenation the boric acid is less tightly bound and can easily be eliminated during the working up.

The main advantage of the new process lies in the fact that the troublesome isolation of d-ribose from its solutions, which entails great losses, can be avoided, even if the solutions contain other sugars, such as, for instance, d-arabinose.

Example 1

62 parts by weight of boric acid are dissolved in a solution of 150 parts by weight of d-ribose in 700 parts of water at 40–45° C. The mixture is cooled down to room temperature and reacted with a solution of 122 parts by weight of 3,4-dimethylaniline in 400 parts by volume of alcohol by stirring. After about 1 or 2 minutes the crystallisation of the boric acid compound begins. For completion of crystallisation the mixture is cooled for 2 hours at 0° C. and then the solid substance separated from the liquid. The precipitate is washed with 250 parts by volume of cold methyl alcohol and 1000 parts by volume of ether and then dried in vacuo at normal temperature. 260 parts by weight of the boric acid compound of the condensation product of d-ribose with 3,4-dimethylaniline are obtained.

The boric acid compound is suspended in 900 parts by volume of methyl alcohol and hydrogenated by means of 60 parts by weight of Raney nickel at a hydrogen-pressure of 30 atmospheres and a starting-temperature of 35° C. The hydrogenation proceeds very quickly under evolution of heat whereby the temperature rises to 60° C. This temperature is maintained for one hour. The methyl alcohol is then driven off with steam. On cooling, the crude ribitylamino-xylol, which still contains some boric acid, crystallises from the aqueous solution. In order to separate the boric acid, the ribitylamino-xylol is dissolved in 3 N aqueous hydrochloric acid, the solution is decolorised by means of charcoal and adjusted with concentrated ammonia to pH 5 by stirring, whereby 190 to 200 parts by weight of pure 1-d-ribitylamino-3,4-xylol of melting point 142° C. crystallise out.

Example 2

600 parts by volume of acetone are added to a solution of 150 parts by weight of d-ribose in 600 parts by weight of water. 62 parts by weight of boric acid are dissolved in this solution at room temperature. 122 parts by weight of melted 3,4-dimethyl-aniline are admixed and, after a short while, the boric acid compound of the condensation product of d-ribose with xylidine crystallises out. In order to complete the crystallisation, the mixture is left to stand at 0° C. for 2 hours. The boric acid compound is separated, washed with 250 parts by volume of acetone and 250 parts by volume of ether and dried in vacuo. Yield: 245 parts by weight. On the further working up of the boric acid compound in accordance with Example 1, 180 to 190 parts by weight of 1-d-ribitylamino-3,4-xylol are obtained.

Example 3

124 parts by weight of boric acid are dissolved in a solution of 150 parts by weight of d-ribose and 150 parts by weight of d-arabinose in 1500 parts of water at 40° C. After cooling down to room temperature a solution of 244 parts by weight of 3,4-dimethylaniline in 800 parts by volume of alcohol is added. The mixture is left to stand at room temperature for 2 hours, whereupon the precipitate is separated, washed with 250 parts by volume of cold methyl alcohol and 1000 parts by volume of ether, whereupon, after drying in vacuo, 265 parts by weight of the boric acid compound of the condensation product of d-ribose with 3,4-dimethylaniline are obtained, whereas no such precipitate is formed with the d-arabinose. On working up of the boric acid compound in accordance with Example 1, 190 parts by weight of 1-d-ribitylamino-3,4-xylol of melting point 142° C. are obtained.

Example 4

300 parts by weight of d-ribonic acid lactone are submitted to electrolytic reduction on a mercury cathode in the presence of 200 parts by weight of boric acid, while using a solution of 600 parts by weight of crystallised sodium sulfate in 3000 parts by weight of water as electrolyte in separated electrode rooms. The solution is then concentrated to 1200 parts by volume and the main part of the sodium sulfate is precipitated with 2000 parts by volume of alcohol and sucked off. The filtrate, which is concentrated to 1200 parts by volume, contains, apart from d-ribose, d-ribonic acid, adonite, excess boric acid and sodium sulfate.

The solution obtained as described above is adjusted by means of 3N bicarbonate of soda and bromo-phenol-blue as an indicator to pH 4 and reacted with 135 parts by weight of 3,4-dimethylaniline while stirring; in order to complete crystallisation, the mixture is kept at 0° C. for 12 hours. After suction-filtration the precipitate is washed with acetone and methyl alcohol and the damp methyl alcoholic boric acid compound of the condensation product of d-ribose with xylidine is hydrogenated in 900 parts by volume of methyl alcohol with 90 parts by weight of Raney nickel at a hydrogen pressure of 30 atmospheres and a temperature of 30–60° C. The further working up is effected in accordance with Example 1. Yield: 200 to 220 parts by weight of 1-d-ribityl-amino-3,4-xylol of melting point 142° C.

I claim:

1. Process for the manufacture of 1-d-ribityl-amino-3,4-xylol, comprising reacting an aqueous solution of d-ribose in the presence of at least 1 mol of boric acid with 1 mol of 3,4-dimethylaniline and catalytically hydrogenating the compound obtained.

2. Process for the manufacture of 1-d-ribityl-amino-3,4-xylol, comprising reacting a solution containing d-ribose in a solvent miscible with water, in the presence of at least 1 mol of boric acid with 1 mol of 3,4-dimethylaniline and catalytically hydrogenating the compound obtained.

3. Process for the manufacture of 1-d-ribityl-amino-3,4-xylol, comprising reacting, at a pH of about 4, an aqueous solution of d-ribose in the presence of at least 1 mol of boric acid with 1 mol of 3,4-dimethylaniline and catalytically hydrogenating the compound obtained.

4. Process for the manufacture of 1-d-ribityl-amino-3,4-xylol, comprising reacting an aqueous solution of d-ribose in the presence of at least 1 mol of boric acid with 1 mol of 3,4-dimethylaniline and catalytically hydrogenating the compound obtained in the presence of an alcoholic solvent.

5. Process for the manufacture of 1-d-ribityl-amino-3,4-xylol, comprising reacting an aqueous solution of d-ribose in the presence of at least 1 mol of boric acid with 1 mol of 3,4-dimethylaniline and catalytically hydrogenating the compound obtained at a temperature not exceeding 60° C.

6. Process for the manufacture of 1-d-ribityl-amino-3,4-xylol, comprising reacting an aqueous solution of d-ribose in the presence of at least 1 mol of boric acid with 1 mol of 3,4-dimethylaniline and hydrogenating the compound obtained while using a substance selected from the group consisting of Raney nickel and palladium charcoal as catalyst.

7. The d-ribose-3,4-dimethylaniline-boric acid complex of the formula $C_{13}H_{18}O_5NB$ having a nitrogen content of 5.14 per cent and decomposing at 183° C.

HANS SPIEGELBERG.